US012562663B2

(12) United States Patent (10) Patent No.: US 12,562,663 B2

Bueno Mariani et al. (45) Date of Patent: Feb. 24, 2026

(54) METHOD AND DEVICE FOR INJECTING HIGH FREQUENCY CURRENT VECTOR

(71) Applicant: MITSUBISHI ELECTRIC CORPORATION, Tokyo (JP)

(72) Inventors: Guilherme Bueno Mariani, Rennes (FR); Nicolas Voyer, Rennes (FR); Gianmario Pellegrino, Turin (IT); Anantaram Varatharajan, Turin (IT)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 162 days.

(21) Appl. No.: 18/574,360

(22) PCT Filed: Jun. 1, 2022

(86) PCT No.: PCT/JP2022/023029

§ 371 (c)(1),
(2) Date: Dec. 27, 2023

(87) PCT Pub. No.: WO2023/286497

PCT Pub. Date: Jan. 19, 2023

(65) Prior Publication Data

US 2024/0313680 A1 Sep. 19, 2024

(30) Foreign Application Priority Data

Jul. 13, 2021 (EP) ..................................... 21305975

(51) Int. Cl.
*H02P 21/22* (2016.01)
*H02P 6/18* (2016.01)
(Continued)

(52) U.S. Cl.
CPC ............ *H02P 21/141* (2013.01); *H02P 6/183* (2013.01); *H02P 21/18* (2016.02); *H02P 2203/11* (2013.01)

(58) Field of Classification Search
CPC ........ H02P 6/183; H02P 21/18; H02P 21/141; H02P 2203/11
(Continued)

(56) References Cited

U.S. PATENT DOCUMENTS

2002/0113569 A1* 8/2002 Iijima ..................... H02P 6/183
318/727
2010/0083461 A1* 4/2010 Norell ................... A47L 9/2831
15/412

(Continued)

FOREIGN PATENT DOCUMENTS

JP 2017-135881 A 8/2017

OTHER PUBLICATIONS

International Search Report, issued in PCT/JP2022/023029, dated Oct. 12, 2022.
(Continued)

*Primary Examiner* — Gabriel Agared
(74) *Attorney, Agent, or Firm* — Birch, Stewart, Kolasch & Birch, LLP

(57) ABSTRACT

A method and a device inject a high frequency current vector which has a fixed angle with the measured current vector flowing in the machine. The method: measures the motor current vector, determines a projection value of the motor current on an axis that is orthogonal to a direction having the fixed angle with the measured current vector, demodulates the high frequency variations of the projection value using a first high frequency demodulation signal, determines at least a first angle from the demodulated high frequency variation, determines the injection voltage vector at least from the first angle, a predetermined voltage and a second high frequency modulating signal, the second high frequency modulating signal having the same frequency as the first high frequency demodulating signal and a phase dif-
(Continued)

ference with the first high frequency demodulating signal that is equal to π/2.

8 Claims, 7 Drawing Sheets

(51) Int. Cl.
    *H02P 21/14*          (2016.01)
    *H02P 21/18*          (2016.01)
(58) Field of Classification Search
    USPC ...................................................... 318/400.02
    See application file for complete search history.

(56)                 References Cited

U.S. PATENT DOCUMENTS

| | | | |
|---|---|---|---|
| 2010/0264861 A1* | 10/2010 | Basic ...................... | H02P 21/18 |
| | | | 318/799 |
| 2014/0225548 A1* | 8/2014 | Xu .......................... | H02P 21/13 |
| | | | 318/400.33 |
| 2020/0099323 A1* | 3/2020 | Luedtke .................. | H02P 21/24 |

OTHER PUBLICATIONS

Written Opinion of the International Searching Authority, issued in PCT/JP2022/023029, dated Oct. 12, 2022.
Japanese Office Action for Japanese Application No. 2024-504348, dated Oct. 1, 2024, with English translation.

\* cited by examiner

S800 — Measure motor currents

S801 — Project current on x axis

S802 — Demodulate with first high frequency demodulation signal

S803 — Low pass filtering

S804 — Determine first angle

S805 — Determine injection voltage vector

METHOD AND DEVICE FOR INJECTING HIGH FREQUENCY CURRENT VECTOR

TECHNICAL FIELD

The present invention relates generally to a method and a device for injecting a high frequency current vector which has a fixed angle with the measured current vector flowing in the machine.

BACKGROUND ART

Electrical machines are widely used on the industry either for factory automation or transportation. Many control techniques for machines as Permanent Magnet Synchronous Machines (PMSM), Synchronous Reluctance Machines (SyncRM), Wounded Rotor Synchronous Machines (WRSM) often use a rotary encoder for obtaining the speed and the position of the machine as feedback.

The demands for low-cost and robust motor drives have increased the development of sensorless control. Without those sensors the machine drives become less expensive and more robust to dusty and harsh environments.

Many controller technologies rely on high frequency signal injection. The injected HF voltage signal is generally superposed to the control voltage waveforms of the machine, causing HF variations of flux in the machine, finally causing HF variations of currents flowing through the machine conductors.

The relation between HF variations of the flux and of the current contains precious information on machine inductances. As example, in absence of position sensor, these information can be used to determine the position of the rotor of the machine. As another example, relationship between chord and incremental inductances can drive the choice of current shoot angle, so as to reach MTPA (Maximum Torque Per ampere) operation point. MTPA conditions produce torque with minimal level of current, thus of losses.

Ideal MTPA operation point is typically identified using lookup tables (LUT). MTPA LUT may be determined manually, or may be built on other inductance or flux maps, which determination also requires specific self commissioning sessions. LUT-less MTPA consists in identifying MTPA operation point in absence of lookup table.

Different injection techniques are known such as sinusoidal, square, and several techniques can be combined across different frequencies and axis frameworks, possibly addressing different purposes, e.g. leading to circular or elliptic injection.

Injection in dq framework, which rotates together with the rotor of the machine and heads to most/least salient directions of the rotor, is popular as it can get used to quickly identify incremental inductances in extreme saliency regions. In contrast, injection in alpha-beta framework, that is fixed and related to stator, requires no knowledge on rotor position.

HF signal injection can be implemented as voltage or current form. While HF voltage injection is straightforward, current injection requires a current regulator, that produces a voltage pattern to drive the measured current towards the desired HF current injection waveform.

The current regulator must be designed with high bandwidth, to enable the tracking of the distance to the desired HF injection signal. This high bandwidth causes a high level of noise on the estimation of instantaneous direction of injection.

If the injected signal is then used for the estimation of rotor position, or for the estimation of ideal shoot angle of motor current to realise MTPA conditions, both noisy estimations can cause instability of the sensorless controller of the machine. This generally requires to limit the bandwidth of speed controller to avoid divergence and limits the applicability of sensorless control to low bandwidth applications.

As the regulator bandwidth is necessarily limited by the switching frequency of the inverter, it is also impossible to inject a very high frequency current, e.g. oscillating close to the switching frequency.

In contrast, some LUT-less MTPA technologies rely on HF current injection strictly perpendicular to the measured current. However, aforementioned problems limit the use of HF current injection for LUT-less MTPA in practical applications in both literature and industry.

To improve the stability and bandwidth of the sensorless control of the machine in absence of LUT, the invention proposes a method for injecting a high frequency current vector which has a fixed angle with the measured current vector flowing in the machine.

SUMMARY OF INVENTION

The present invention aims to provide a method for injecting a high frequency current vector which has a fixed angle with the measured current vector flowing in the machine.

To that end, the present invention concerns a method for injecting a high frequency current vector which has a fixed angle with the measured current vector flowing in the machine, characterized in that the method comprises the steps of:

measuring the motor current vector, determining a projection value of the motor current vector on an axis that is orthogonal to a direction having the fixed angle with the measured current vector, demodulating the high frequency variations of the projection value using a first high frequency demodulation signal, determining at least a first angle from the demodulated high frequency variations, determining the injection voltage vector at least from the first angle, a predetermined voltage and a second high frequency modulating signal, the second high frequency modulating signal having the same frequency as the first high frequency demodulating signal and a phase difference with the first high frequency demodulating signal that is equal to $\Pi/2$.

The present invention concerns also a device for injecting a high frequency current vector which has a fixed angle with the measured current vector flowing in the machine, characterized in that the device comprises:

means for measuring the motor current vector, means for determining a projection value of the motor current on an axis that is orthogonal to a direction having the fixed angle with the measured current vector, means for demodulating the high frequency variations of the projection value using a first high frequency demodulation signal, means for determining at least a first angle from the demodulated high frequency variation, means for determining the injection voltage vector at least from the first angle, a predetermined voltage and a second high frequency modulating signal, the second high frequency modulating signal having the same frequency as the first high frequency demodulating signal and a phase difference with the first high frequency demodulating signal that is equal to Π/2.

Thus, the first angle is driven to minimise the projection of HF current orthogonal to the desired direction. As the machine is mainly inductive, the resulting HF current necessarily flows in the desired direction, forming the fixed angle with the measured current vector flowing in the machine. The perturbations on controller stability, resulting from non constant angle, are much reduced, globally increasing the stability of the controller.

According to a particular feature, the injection voltage vector is determined from the first angle $\Psi$ and the angle of measured current vector $\gamma_s$ by executing an $e^{J\psi+\beta_s}$ transform where J is the matrix $$\begin{bmatrix} 0 & -1 \\ +1 & 0 \end{bmatrix}$$

that is multiplied by the high frequency signal $v_h(\omega_h t)$ where $v_h$ is the amplitude of the voltage injection in order to obtain the injection voltage vector in the $\alpha\beta$ framework.

Thus, the voltage vector forms a stable angle $\Psi$ with the measured current vector. This angle is controlled to drive the HF response of the current in the desired direction having a fixed angle with the measured current vector. The angle $\Psi$ does not need to follow the rotation of the measured current vector with the fundamental frequency, relaxing the constraints on the design of a PI filter. The direction of high frequency current injection is well stabilised with respect to measured current vector. The injection frequency can get increased, up to the switching frequency of the inverter. The ability of the controller to react to fast injection is increased, e.g. it can estimate more quickly the MTPA and the voltage levels needed to reach a desired torque. The controller performance is globally improved despite of absence of lookup tables of machine parameters.

According to a particular feature, the method further comprises the steps of:

demodulating the high frequency variations of the projection value using a second high frequency demodulation signal having the same frequency as the first high frequency demodulating signal and a phase difference with the first high frequency demodulating signal that is equal to Π/2, determining a second angle from the high frequency variations of the projection value demodulated using the second high frequency demodulating signal, weighting the first and second angles by respective weights that are determined from the demodulated high frequency variations of the values of the motor current on the axis that is orthogonal to the direction having the fixed angle with the measured current vector using the first and second high frequency demodulating signals, summing the weighted first and second angles, and the determined injection voltage vector is determined from the summed weighted first and second angles.

Thus, both the quadrature and in phase components of the HF current response are minimised orthogonally to the desired injection direction. The HF current response can hold the two components due to the complex response of the machine, that contains both in phase (resistive) and quadrature impedances (inductive). The method needs no assumption on the impedance of the machine and equally operates at any injection frequency. The signal to noise ratio on the desired angle is improved.

According to a particular feature, the projection value of the motor current on the axis that is orthogonal to the direction having the fixed angle with the measured current vector is determined by transforming the measured current motor vector $i_{\alpha\beta}$ in the $\alpha\beta$ framework into a measured current motor vector $i_{xy}$ in the xy framework using a measured angle $\gamma_s$ between the measured current vector in the $\alpha\beta$ framework and the $\alpha$ axis of $\alpha\beta$ framework where $$\gamma_s = \arctan\left(\frac{i_\beta}{i_\alpha}\right),$$

the xy framework being rotated from the $\alpha\beta$ framework by an angle equal to sum of the measured angle $\gamma_x$ and the fixed angle $\Delta$ minus Π/2, and by keeping only the measured current in the x axis.

Thus, the angle of the current vector in the machine is precisely calculated.

According to a particular feature, the determining of the first angle from the demodulated high frequency variation is performed using a Proportional Integral regulator with an integral gain of $k_1$ and a proportional gain equal to null value.

Thus, the present invention enables to obtain an angle that ensures that the high frequency inductive component of the motor current vector has a fixed angle with respect to the measured current vector flowing in a machine.

According to a particular feature, the determining of the second angle is performed using a Proportional Integral regulator with the integral gain of $k_1$ and a proportional gain equal to null value.

Thus, the present invention enables to obtain an angle that ensures that the high frequency inductive component of the motor current vector has a fixed angle with respect to the measured current vector flowing in a machine.

The characteristics of the invention will emerge more clearly from a reading of the following description of example embodiments, the said description being produced with reference to the accompanying drawings.

DESCRIPTION OF EMBODIMENTS

Figure 1:
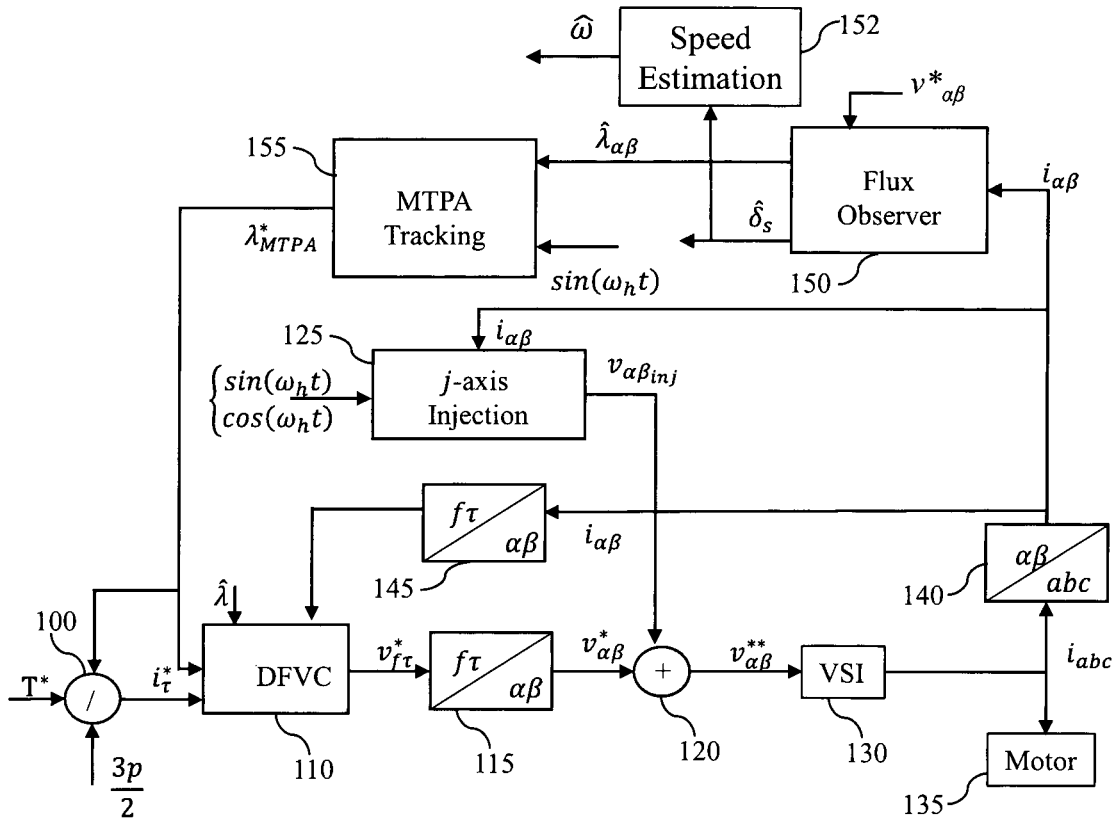
FIG. 1 represents an example of a direct flux vector control of a motor using maximum torque per ampere in which the present invention is implemented.

FIG. 1 represents a first example of a direct flux vector control of a motor using maximum torque per ampere in which the present invention is implemented.

It has to be noted here that the present invention is disclosed in an example wherein an MTPA module is used. The present invention is also applicable for example for determining the position of the machine or estimating parameters of the machine under control.

In the system shown in FIG. 1, the reference torque T* is fed to a divider 100 together with a reference flux $\lambda^*_{MTPA}$ provided by a MTPA tracking module 155 and 3/2 times the number of poles pairs of the motor 135 in order to obtain a reference current i*$_\tau$ in a $\tau$ axis that is provided to a DFVC module 110.

$$i^*_\tau = \frac{2}{3p} \frac{T^*}{\lambda^*_{MTPA}}$$

The DFVC module 110, from the reference current i*$_\tau$ in the $\tau$ axis, an estimated flux $\hat{\lambda}$ norm, a measured current i$_{f\tau}$ in a f$\tau$ framework and the reference flux $\lambda^*_{MTPA}$ from the MTPA tracking module 155, determine a reference voltage v*$_{f\tau}$ in the f$\tau$ framework.

The reference voltage v*$_{f\tau}$ in in the f$\tau$ framework is provided to a framework transformation module 115 that transforms the reference voltage v*$_{f\tau}$ in the f$\tau$ framework into a reference voltage v*$_{\alpha\beta}$ in the $\alpha\beta$ framework using an estimated load angle $\hat{\delta}_s$.

The reference voltage v*$_{\alpha\beta}$ in the $\alpha\beta$ framework is provided to a summation module 120 that sums the reference voltage v*$_{\alpha\beta}$ with high frequency injection voltage v$_{\alpha\beta_{inj}}$ in the $\alpha\beta$ framework in order to obtain a modified reference voltage v**$_{\alpha\beta}$ in the $\alpha\beta$ framework.

The modified reference voltage v**$_{\alpha\beta}$ in the $\alpha\beta$ framework is provided to a voltage source inverter VSI 130 that is connected to the motor 135. The motor current vector i$_{abc}$ measured in the three phases abc is provided to a framework transformation module 140.

The framework transformation module 140 transforms the motor current i$_{abc}$ measured in the three phases abc in a measured motor current vector i$_{\alpha\beta}$ in the $\alpha\beta$ framework.

The measured current motor vector i$_{\alpha\beta}$ in the $\alpha\beta$ framework is provided to a flux estimation module 150, a j-axis injection module 125 and to a framework transformation module 145.

The framework transformation module 145 transforms the measured current motor vector i$_{\alpha\beta}$ in the $\alpha\beta$ framework into a measured current motor vector i$_{f\tau}$ the f$\tau$ framework using an estimated load angle $\hat{\delta}_s$.

The measured current vector i$_{f\tau}$ in the f$\tau$ axis is provided to the DFVC module 110.

The injection module 125 determines the injection voltage vector v$_{\alpha\beta_{inj}}$ in the $\alpha\beta$ framework from the measured current motor vector i$_{\alpha\beta}$ in the $\alpha\beta$ framework and a high frequency signals sin($\omega_h$t) and cos($\omega_h$t).

The high frequency injection voltage (v$_{\alpha\beta_{inj}}$) is determined in order to provide a high frequency current response of the motor to the injected voltages that are perpendicular to the measured motor current vector.

The high frequency injection voltage (v$_{\alpha\beta_{inj}}$) is in a frequency range between 100 Hz—to the switching frequency of the voltage source inverter VSI 130.

The flux estimation module 150 determines, from the measured current motor vector i$_{\alpha\beta}$ in the $\alpha\beta$ framework and the voltage references v*$_{\alpha\beta}$, the estimated flux $\hat{\lambda}_{\alpha\beta}$ in the $\alpha\beta$ framework and the estimated load angle $\hat{\delta}_s$.

The speed estimation module 152 determines the speed of the motor 135 from the estimated load angle.

For example, the speed $\hat{\omega}$ is estimated using a phase lock loop and a low pass filtering of the output of the phase lock loop.

The estimated flux $\hat{\lambda}_{\alpha\beta}$ in the $\alpha\beta$ framework is provided to a MTPA tracking module 155 and to the DFVC module 110.

The MTPA tracking module 155 determines, from the estimated flux $\hat{\lambda}_{\alpha\beta}$ in the $\alpha\beta$ framework and the high frequency sinewave signal sin($\omega_h$t), the reference flux $\lambda^*_{MTPA}$.

Figure 2:
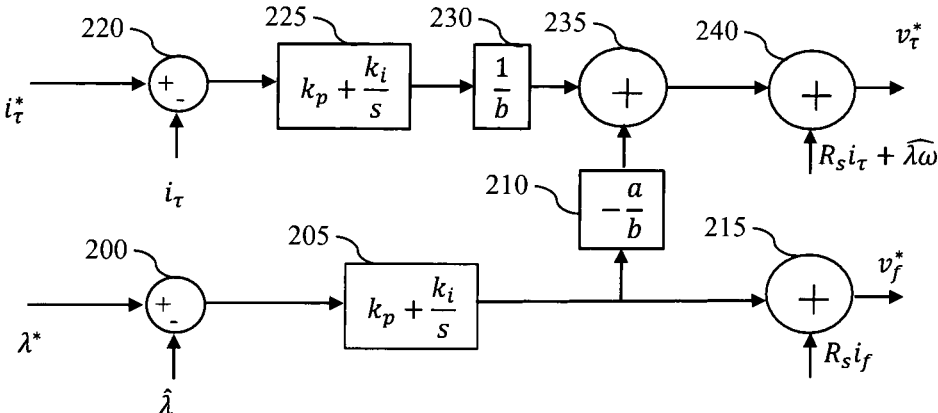
FIG. 2 represents an example of a block diagram of a direct flux vector control module.

FIG. 2 represents an example of a block diagram of a direct flux vector control module.

The direct flux vector control module 110 comprises a subtracting module 220 that subtracts from the reference current i*$_\tau$ in the $\tau$ axis, the measured current i$_\tau$ in the $\tau$ axis.

The output of the subtracting module 220 is provided to a PI regulator 225 the output of which is provided to a multiplication module 230 that multiplies the output of the PI regulator 225 by a decoupling constant value 1/b.

The direct flux vector control module 110 comprises a subtracting module 200 that subtracts from the reference flux $\lambda^*_{MTPA}$, the estimated flux norm $$\hat{\lambda} = \sqrt{\hat{\lambda}_\alpha^2 + \hat{\lambda}_\beta^2}.$$

The output of the subtracting module 200 is provided to a PI regulator 205 the output of which is provided to a multiplication module 210 that multiplies the output of the PI regulator 205 by a decoupling constant value-a/b that is dependent of the motor. As example, values for a and b are a=4 and b=13.

The outputs of the multiplication modules 230 and 210 are summed by a summation module 235.

The output of the summation module 235 is provided to a summation module 240 that sums the result of the summation performed by the summation module 235 to R$_s$i$_\tau$+$\hat{\lambda}\hat{\omega}$ in order to provide the reference voltage v*$_\tau$ in the $\tau$ axis, where R$_s$ is the stator resistance, and $\hat{\omega}$ is the estimated motor speed.

The Stator resistance R$_s$ is for example obtained from a self-commissioning procedure. The motor speed is estimated from the variations of the angle $\hat{\delta}_s$ of the estimated flux vector.

The output of the PI regulator 205 is provided to a summation module 215 that sums the result of the output of the PI regulator 205 to R$_s$i$_f$ in order to provide the reference voltage v*$_f$ in the f axis.

Figure 3:
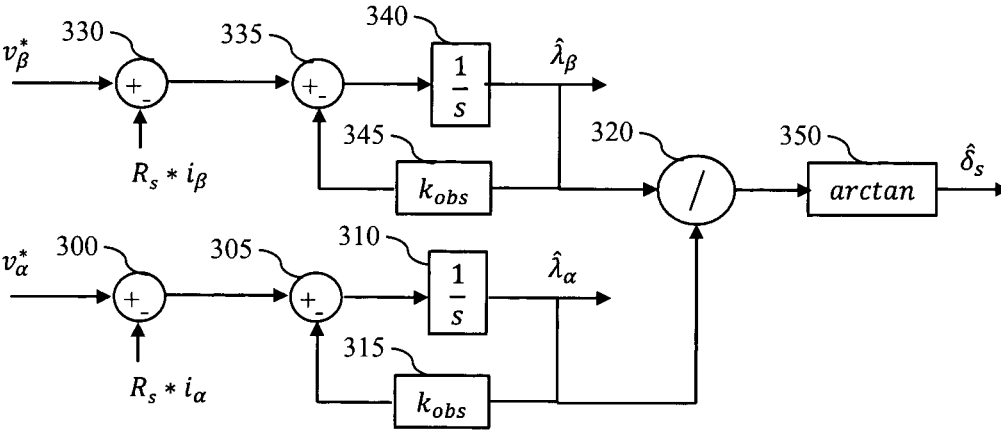
FIG. 3 represents an example of a block diagram of a flux observer module.

FIG. 3 represents an example of a block diagram of a flux observer module.

The flux estimation module 150 comprises a subtracting module 300 that subtracts from the reference voltage v*$_\alpha$ in the $\alpha$ axis the current i$_\alpha$ in the $\alpha$ axis multiplied by the resistance R$_s$.

The result of the subtracting module 300 is provided to a subtracting module 305.

The subtracting module 305 subtracts from the result of the subtracting module 300 a result provided by a multiplication module 315.

The output of the subtracting module 305 is provided to an integrator 310 in order to provide the estimated flux $\hat{\lambda}_\alpha$ in the $\alpha$ axis.

The estimated flux $\hat{\lambda}_\alpha$ in the $\alpha$ axis is provided to a divider 320 and to the multiplication module 315 that multiplies the estimated flux $\hat{\lambda}_\alpha$ in the $\alpha$ axis by a coefficient $k_{obs}$ that is an observation gain.

The flux estimation module 150 comprises a subtracting module 330 that subtracts from the reference voltage $v^*_\beta$ in the $\beta$ axis the current $i_\beta$ in the $\beta$ axis multiplied by the resistance $R_s$ of the motor 135.

The result of the subtracting module 330 is provided to a subtracting module 335.

The subtracting module 335 subtracts from the result of the subtracting module 330 a result provided by a multiplication module 345.

The output of the subtracting module 335 is provided to an integrator 340 in order to provide the estimated flux $\hat{\lambda}_\beta$ in the $\beta$ axis.

The estimated flux $\hat{\lambda}_\beta$ in the $\beta$ axis is provided to the divider 320 and to the multiplication module 345 that multiplies the estimated flux $\hat{\lambda}_\beta$ in the $\beta$ axis by the coefficient $k_{obs}$.

The division module 320 divides the estimated flux $\hat{\lambda}_\beta$ in the $\beta$ axis by the estimated flux $\hat{\lambda}_\alpha$ in the $\alpha$ axis.

The result of the division module 320 is transformed by arctangent by the module 350 in order to provide the estimated load angle $\hat{\delta}_s$.

Figure 4:
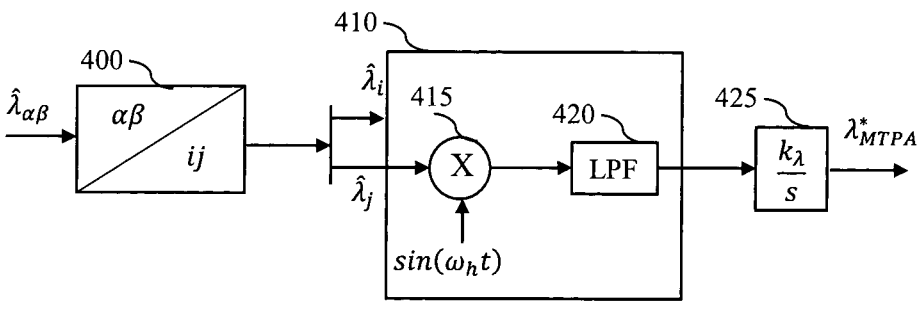
FIG. 4 represents an example of a block diagram of a maximum torque per ampere module.

FIG. 4 represents an example of a block diagram of a maximum torque per ampere module.

The maximum torque per ampere module 155 comprises a framework transformation module 400 that transforms the estimated flux $\hat{\lambda}_{\alpha\beta}$ in the $\alpha\beta$ framework into an estimated flux $\hat{\lambda}_{ij}$ in the ij framework using a measured angle $\gamma_s$ between the measured currents and the $\alpha$ axis of $\alpha\beta$ framework.

The estimated flux $\hat{\lambda}_j$ in the j axis is provided to multiplier 415 that multiplies the estimated flux $\hat{\lambda}_j$ in the j axis by the high frequency sinewave signal $\sin(\omega_h t)$.

The output of the multiplication module 415 is processed by a low pass filter 420.

Modules 415 and 420 form a heterodyne demodulation 410.

The output of the heterodyne modulation 410 is provided to a PI regulator 425 with an integral gain of $k_\lambda$ and proportional gain zero in order to provide the reference flux $\lambda^*_{MTPA}$.

The reference flux $\lambda^*_{MTPA}$ is thus controlled to ensure that the flux response to the high frequency injection voltage is null on the j axis, and thus only located on the i axis. The high frequency flux response to the injected voltage is aligned with the measured current vector.

Figure 5A:
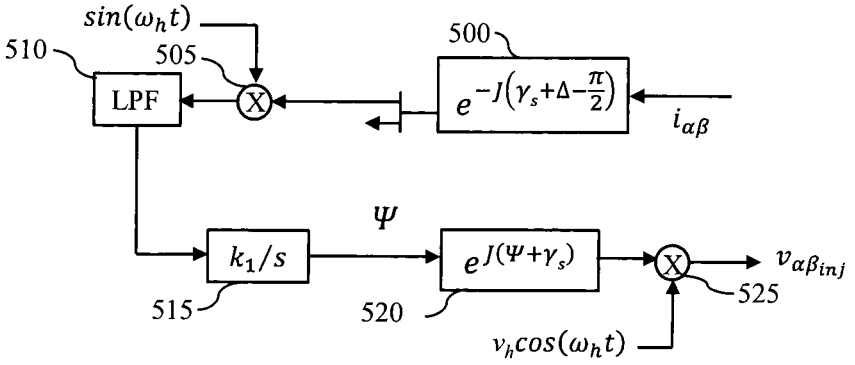
FIG. 5a represents a first example of a block diagram of an injection module according to the present invention.

FIG. 5a represents a first example of a block diagram of an injection module according to the present invention.

The injection module 125 comprises a framework transformation module 500 that transforms the measured current motor vector $i_{\alpha\beta}$ in the $\alpha\beta$ framework into a measured current motor vector $i_{xy}$ in the xy framework using a measured angle $\gamma_s$ between the measured current vector in the $\alpha\beta$ framework where $$\gamma_s = \arctan\left(\frac{i_\beta}{i_\alpha}\right).$$

The xy framework is rotated from the $\alpha\beta$ framework by an angle equal to sum of the measured angle and a fixed angle $\Delta$ minus $\pi/2$. $\Delta$ is comprised between 0 and $\pi/2$. Only the measured current in the x axis is provided to a multiplier 505. In other words, the measured current motor vector is projected in the x axis. The measured current in the x axis corresponds to the projection of the measured current vector in the direction orthogonal to the fixed angle $\Delta$. The multiplier 505 multiplies the high frequency sinewave $\sin(\omega_h t)$ to the measured current in the x axis in order to demodulate the high frequency variations of the norm of the measured current motor vector.

The output of the multiplier 505 is provided to a low pass filter 510.

The output of the low pass filter 510 is provided to a Proportional Integral regulator 515 with an integral gain of $k_1$ which value is between 0.01 and 0.5 depending on the machine ratings, the injection frequency and magnitude and the sampling frequency, and a proportional gain equal to null value. The output of the proportional integral regulator 515 is an angle $\Psi$ that is provided to a transformation module 520.

The transformation module 520 performs an $e^{J(\Psi+\gamma s)}$ transform where J is the matrix $$\begin{bmatrix} 0 & -1 \\ +1 & 0 \end{bmatrix}.$$

The output of the transformation module 520 is provided to a multiplier 525. The multiplier 525 multiplies the output of the transformation module 520 by the high frequency signal $v_h \cos(\omega_h t)$ where $v_h$ is the amplitude of the voltage injection in order to obtain the voltage injection signal $v_{\alpha\beta_{inj}}$ in the $\alpha\beta$ framework.

Figure 5B:
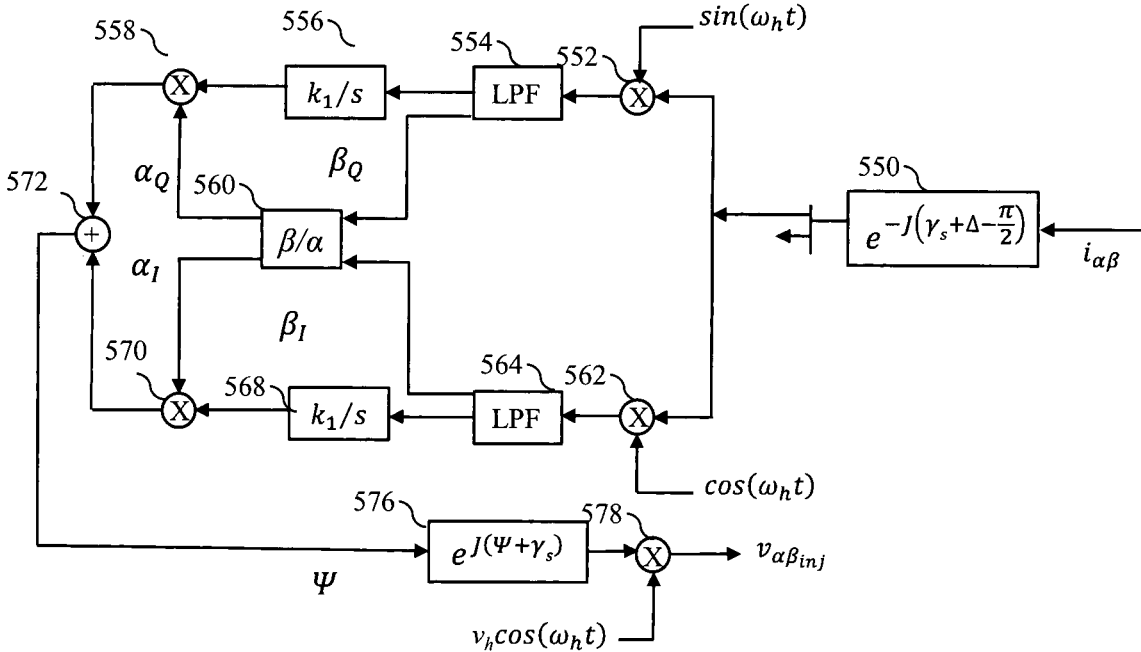
FIG. 5b represents a second example of a block diagram of an injection module according to the present invention.

FIG. 5b represents a second example of a block diagram of an injection module according to the present invention.

The injection module 125 comprises a framework transformation module 550 that transforms the measured current motor vector $i_{\alpha\beta}$ in the $\alpha\beta$ framework into a measured current motor vector $i_{xy}$ in the xy framework using a measured angle $\gamma_s$ between the measured current vector in the $\alpha\beta$ framework and the $\alpha$ axis of $\alpha\beta$ framework where $$\gamma_s = \arctan\left(\frac{i_\beta}{i_\alpha}\right).$$

The xy framework is rotated from the $\alpha\beta$ framework by an angle equal to sum of the measured angle and the fixed angle $\Delta$ minus $\pi/2$. $\Delta$ is comprised between 0 and $\pi/2$.

The measured current in the x axis is provided to a multiplier 552. The measured current in the x axis corresponds to the projection of measured current vector in the direction orthogonal to the fixed angle $\Delta$. The multiplier 552 multiplies the quadrature high frequency sine waveform $\sin(\omega_h t)$ to the measured current in the x axis in order to demodulate the high frequency variations of the measured current in the x axis. The output of the multiplier 552 is provided to a low pass filter 554.

The low pass filter 554 has a cut frequency which is smaller than the frequency $\omega_h$ of the injected signal.

The output of the low pass filter 554 is provided to a Proportional Integral regulator 556 with an integral gain of $k_1$, which value is between 0.01 and 0.5 depending on the machine ratings, the injection frequency and magnitude and the sampling frequency, and a proportional gain equal to null value. The output of the proportional integral regulator 556 is a first angle that is provided to a multiplier 558.

The measured current in the x axis, or in other words projected in the x axis, is provided to a multiplier 562. The multiplier 562 multiplies the in-phase high frequency cosine waveform $\cos(\omega_h t)$ to the measured current in the x axis in order to demodulate the high frequency variations of the measured current in the x axis. The output of the multiplier 562 is provided to a low pass filter 564.

The low pass filter 564 has a cut frequency which is smaller than the frequency $\omega_h$ of the injected signal.

The output of the low pass filter 564 is provided to a Proportional Integral regulator 568 with an integral gain of $k_1$, the value of which is between 0.01 to 0.5 and a proportional gain equal to null value. The output of the proportional integral regulator 568 is provided to a multiplier 570 and is a second angle.

The demodulated and filtered measured current in the x axis $\beta_Q$ and $\beta_I$ is provided to a weight calculation module 560 that determines a weight $\alpha_Q$ that is provided to the multiplier 558 and a weight $\alpha_I$ that is provided to the multiplier 570.

$$\begin{cases} \alpha_I = \dfrac{\|\beta_I\|^2}{\|\beta_Q\|^2 + \|\beta_I\|^2} \\[2ex] \alpha_Q = \dfrac{\|\beta_Q\|^2}{\|\beta_Q\|^2 + \|\beta_I\|^2} \end{cases}$$

The output $\alpha_Q$ of the weight calculation module 560 is multiplied to the first angle provided by the proportional integral regulator 556 by a multiplier 558.

The output $\alpha_I$ of the weight calculation module 560 is multiplied to the second angle provided by the proportional integral regulator 568 by a multiplier 570.

The outputs of the multipliers 558 and 570 are summed by a summation module 572.

The output of the summation module 572 is an angle $\Psi$ that is provided to a transformation module 576. The transformation module 576 performs an $e^{J(\Psi + \gamma s)}$ transform where J is the matrix $$\begin{bmatrix} 0 & -1 \\ +1 & 0 \end{bmatrix}.$$

The output of the transformation module 576 is provided to a multiplier 578. The multiplier 578 multiplies the output of the transformation module 576 by the high frequency signal $v_h \cos(\omega_h t)$ where $v_h$ is the voltage injection amplitude in order to obtain the injection signal voltage $v_{\alpha\beta_{inj}}$ in the $\alpha\beta$ framework.

Figure 6:
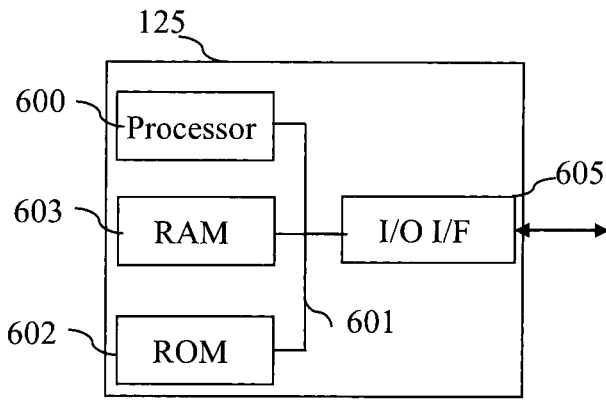
FIG. 6 represents a third example of a block diagram of an injection module according to the present invention.

FIG. 6 represents a third example of a block diagram of an injection module according to the present invention.

Figure 8A:
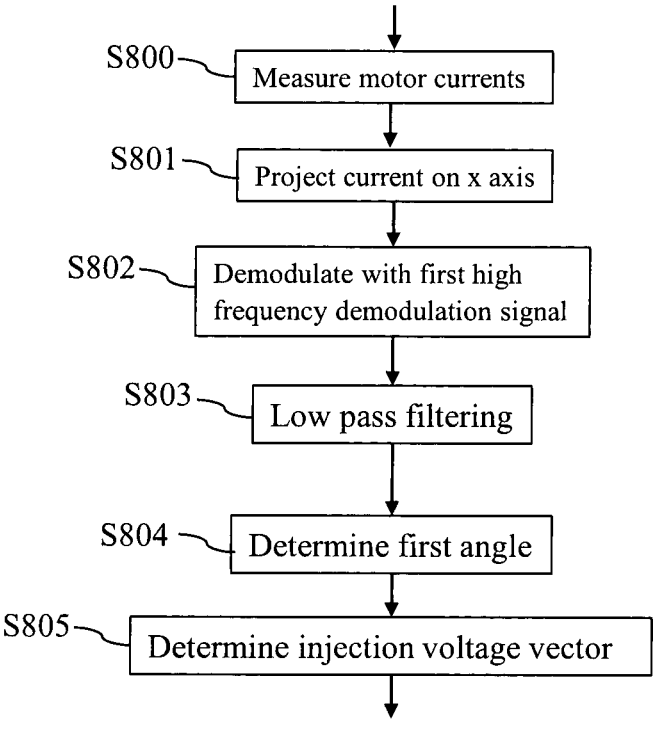
FIG. 8a represents a first example of an algorithm for determining an injection voltage vector to be added to a signal for driving a motor according to the invention.
Figure 8B:
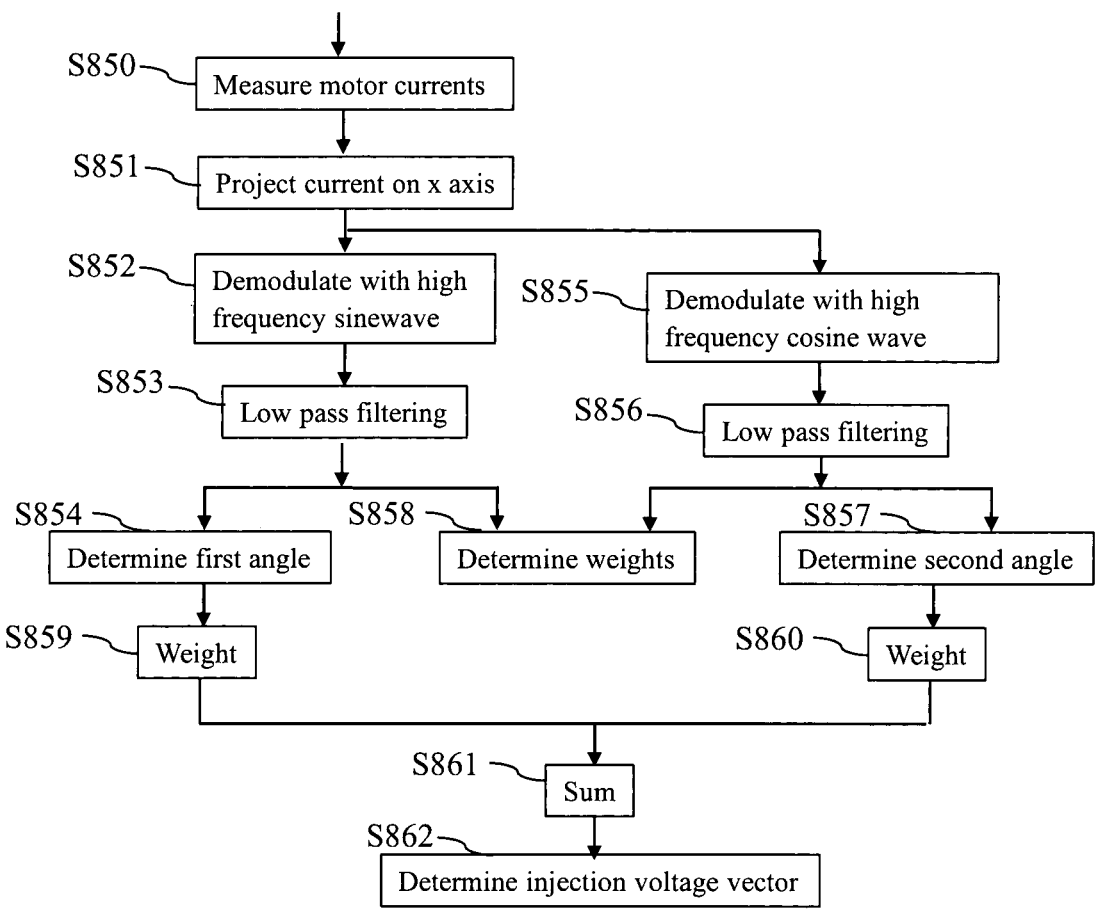
FIG. 8$b$ represents a second example of an algorithm for determining an injection voltage vector to be added to a signal for driving a motor according to the invention.

The injection module 125 has, for example, an architecture based on components connected by a bus 601 and a processor 600 controlled by a program as disclosed in FIG. 8a or 8b.

The bus 601 links the processor 600 to a read only memory ROM 602, a random access memory RAM 603, an input output I/O IF interface 605.

The input output I/O IF interface 605 enables the injection module 125 to sense signals representative of current flowing through the motor 135 and predetermined signals.

The memory 603 contains registers intended to receive variables and the instructions of the program related to the algorithm as disclosed in FIG. 8a or 8b.

The read-only memory, or possibly a Flash memory 602, contains instructions of the programs related to the algorithm as disclosed in FIG. 8a or 8b, when the injection module 125 is powered on, that are loaded to the random access memory 603. Alternatively, the program may also be executed directly from the ROM memory 602.

The calculation performed by the injection module 125 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the injection module 125 includes circuitry, or a device including circuitry, causing the injection module 125 to perform the program related to the algorithm as disclosed in FIG. 8a or 8b.

Figure 7:
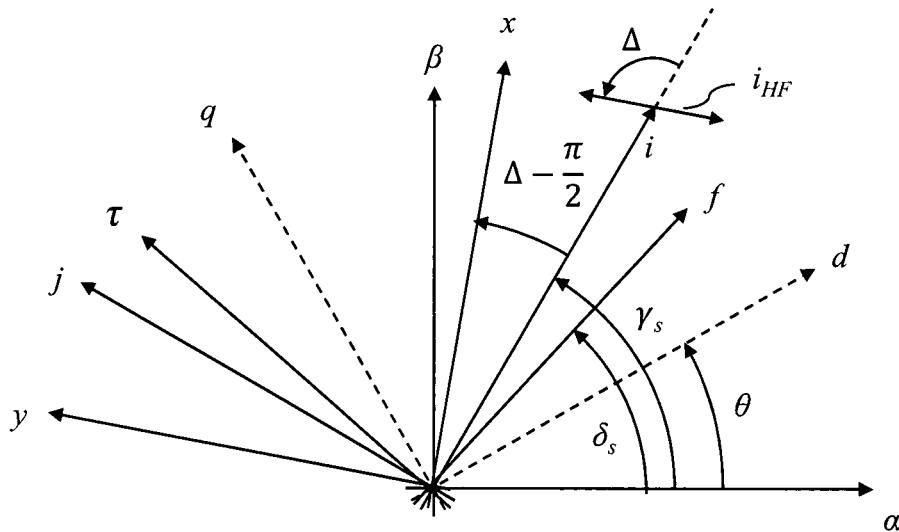
FIG. 7 represents the motor frameworks used by the present invention.

FIG. 7 represents the motor frameworks used by the present invention.

In FIG. 7, $\alpha\beta$ two phase stator framework is represented. The $\alpha\beta$ framework is static in reference to the stator of the motor.

The dq two phase rotor framework is represented. The dq framework is dynamic and follows the rotor position $\theta$.

The ij two phase current framework is represented. The i axis follows the current vector, forming an angle $\gamma_s$ with the $\alpha$ axis, while the j axis is perpendicular to the current vector.

The ft two phase flux framework is represented. The f axis follows the estimated flux vector, forming an angle $\delta_s$ with the $\alpha$ axis, while the $\tau$ axis is perpendicular to the estimated flux vector.

The xy framework is represented. The y axis follows the fixed angle $\Delta$ with the vector current in the x axis.

The HF current response $i_{HF}$ to the high frequency voltage injection is represented. The HF current response $i_{HF}$ is perpendicular to the x axis, thus forming the fixed angle $\Delta$ with the measured current vector flowing in the machine.

The HF response $\lambda_{HF}$ of the estimated flux to the high frequency injection voltage is represented. The HF response $\lambda_{HF}$ is aligned with the i axis, thus aligned with the measured current vector.

FIG. 8a represents a first example of an algorithm for determining an injection voltage vector to be added to a signal for driving a motor according to the invention.

The present algorithm is disclosed in an example wherein it is executed by the processor 600 of the injection module 125.

At step S800, the processor 600 obtains measurements of the motor current vector.

At step S801, the processor 600 determines the projection of the motor current vector in the direction orthogonal to the fixed angle $\Delta$ for example by transforming the measured current motor vector $i_{\alpha\beta}$ in the $\alpha\beta$ framework into a measured current motor vector $i_{xy}$ in the xy framework using a measured angle $\gamma_s$ between the measured currents in the $\alpha\beta$ framework where $$\gamma_s = \arctan\left(\frac{i_\beta}{i_\alpha}\right),$$

the xy framework being rotated from the αβ framework by an angle equal to sum of the measured angle and the fixed angle Δ minus π/2 and keeping only the measured current in the x axis.

At step S802, the processor 600 demodulates the high frequency variations of the measured current in the x axis using a first high frequency demodulation signal sin($\omega_h$t).

At step S803, the processor 600 executes a first low pass filtering of the demodulated high frequency variations of the measured current in the x axis using the first high frequency signal.

At step S804, the processor 600 determines at least a first angle Π from the first low pass filtered demodulated measured current in the x axis by the first high frequency signal, for example using a Proportional Integral regulator with an integral gain of $k_1$ and a proportional gain equal to null value.

At step S805, the processor 600 determines the injection voltage vector at least from the first angle, a predetermined voltage and a first high frequency modulating signal, the first high frequency modulating signal having the same frequency as the first high frequency demodulating signal and a phase difference with the first high frequency demodulating signal that is equal to π/2.

For example, the processor 600 determines the injection voltage vector by executing an $e^{(\Psi+\gamma s)}$ transform where J is the matrix $$\begin{bmatrix} 0 & -1 \\ +1 & 0 \end{bmatrix}$$

that is multiplied by the high frequency signal $v_h$ cos($\omega_h$t) where $v_h$ is the amplitude of the voltage injection in order to obtain the injection voltage vector $v_{\alpha\beta_{inj}}$ in the αβ framework.

FIG. 8b represents a second example of an algorithm for determining an injection voltage vector to be added to a signal for driving a motor according to the invention.

The present algorithm is disclosed in an example wherein it is executed by the processor 600 of the injection module 125.

At step S850, the processor 600 obtains measurements of the motor current vector.

At step S851, the processor 600 determines the projection of the motor current vector in the direction orthogonal to the fixed angle Δ for example by transforming the measured current motor vector $i_{\alpha\beta}$ in the αβ framework into a measured current motor vector $i_{xy}$ in the xy framework using a measured angle $\gamma_s$ between the measured currents in the αβ framework where $$\gamma_s = \arctan\left(\frac{i_\beta}{i_\alpha}\right),$$

the xy framework being rotated from the αβ framework by an angle equal to sum of the measured angle and the fixed angle Δ minus π/2 and keeping only the measured current in the x axis.

At step S852, the processor 600 demodulates the high frequency variations of the measured current in the x axis using a first high frequency demodulation signal sin($\omega_h$t).

At step S853, the processor 600 executes a first low pass filtering of the demodulated high frequency variations of the measured current in the x axis using the first high frequency demodulation signal.

At step S854, the processor 600 determines a first angle from the first low pass filtered demodulated high frequency variations of the measured current in the x axis by the first high frequency demodulation signal, for example using a Proportional Integral regulator with an integral gain of $k_1$ and a proportional gain equal to null value.

At step S855, the processor 600 demodulates the high frequency variations of the measured current in the x axis using a second high frequency demodulation signal cos ($\omega_h$t).

At step S856, the processor 600 executes a second low pass filtering of the demodulated high frequency variations of the measured current in the x axis using the second high frequency demodulation signal.

At step S857, the processor 600 determines a second angle from the second low pass filtered demodulated high frequency variations of the measured current in the x axis by the second high frequency demodulation signal, for example using a Proportional Integral regulator with an integral gain of $k_1$ and a proportional gain equal to null value.

At step S858, the processor 600 using the demodulated and filtered measured currents in the x axis $\beta_I$ and $\beta_Q$ provided respectively by the low pass filtering steps S853 and S856 determines weights $\alpha_I$ and $\alpha_Q$.

$$\begin{cases} \alpha_I = \dfrac{\|\beta_I\|^2}{\|\beta_Q\|^2 + \|\beta_I\|^2} \\ \alpha_Q = \dfrac{\|\beta_Q\|^2}{\|\beta_Q\|^2 + \|\beta_I\|^2} \end{cases}$$

At step S859, the processor 600 multiplies the first angle by the weight $\alpha_Q$.

At step S860, the processor 600 multiplies the second angle by the weight $\alpha_I$.

At step S861, the processor 600 sums the outputs of the steps S859 and S860.

The output of the summation step is an injection angle Ψ that is transformed at step S862 by the processor 600 using an $e^{J(\Psi+\gamma s)}$ transform where J is the matrix $$\begin{bmatrix} 0 & -1 \\ +1 & 0 \end{bmatrix}.$$

and modulated by the second high frequency signal $v_h$ cos($\omega_h$t) where $v_h$ is the voltage injection amplitude in order to obtain the injection signal voltage $v_{\alpha\beta_{inj}}$ in the αβ framework.

Naturally, many modifications can be made to the embodiments of the invention described above without departing from the scope of the present invention.

The invention claimed is:

1. A method for injecting a high frequency current vector which has a fixed angle with a measured current vector flowing in a machine, characterized in that the method comprises:
    measuring a motor current vector,
    determining a projection value of a motor current on an axis that is orthogonal to a direction having the fixed angle with the measured current vector,
    demodulating a high frequency variations of the projection value using a first high frequency demodulation signal, determining at least a first angle from the demodulated high frequency variation, determining an injection voltage vector at least from the first angle, a predetermined voltage and a second high frequency modulating signal, the second high frequency modulating signal having the same frequency as the first high frequency demodulating signal and a phase difference with the first high frequency demodulating signal that is equal to $\pi/2$.

2. The method according to claim 1, characterized in that the injection voltage vector is determined from the first angle $\Psi$ and the angle of measured current vector $\gamma_s$ by executing a $e^{J(\Psi + \gamma_s)}$ transform where J is a matrix $$\begin{bmatrix} 0 & -1 \\ +1 & 0 \end{bmatrix}$$

that is multiplied by a high frequency signal $v_h \cos(\omega_h t)$ where $v_h$ is an amplitude of the injection voltage vector in order to obtain the injection voltage vector in an $\alpha\beta$ framework.

3. The method according to claim 1, characterized in that the method further comprises:

demodulating the high frequency variations of the projection value using a second high frequency demodulation signal having the same frequency as the first high frequency demodulating signal and a phase difference with the first high frequency demodulating signal that is equal to $\pi/2$, determining a second angle from the high frequency variations of the projection value demodulated using the second high frequency demodulating signal, weighting the first and second angles by respective weights that are determined from the demodulated high frequency variations of the values of the motor current on the axis that is orthogonal to the direction having the fixed angle with the measured current vector using the first and second high frequency demodulating signals, summing the weighted first and second angles, and the determined injection voltage vector is determined from the summed weighted first and second angles.

4. The method according to claim 1, characterized in that the projection value of the motor current on the axis that is orthogonal to the direction having the fixed angle with the measured current vector is determined by transforming the measured motor current vector $i_{\alpha\beta}$ in an $\alpha\beta$ framework into a measured current motor vector $i_{xy}$ in an xy framework using a measured angle $\gamma_s$ between the measured current vector in the $\alpha\beta$ framework and an $\alpha$ axis of $\alpha\beta$ framework where $$\gamma_s = \arctan\left(\frac{i_\beta}{i_\alpha}\right),$$

the xy framework being rotated from the $\alpha\beta$ framework by an angle equal to sum of the measured angle $\gamma_s$ and the fixed angle $\Delta$ minus $\pi/2$, and by keeping only the measured current in an x axis.

5. The method according to claim 1, characterized in that the determining of the first angle from the demodulated high frequency variation is performed using a Proportional Integral regulator with an integral gain of $k_1$ and a proportional gain equal to null value.

6. The method according to claim 3, characterized in that the determining of the second angle is performed using a Proportional Integral regulator with the integral gain of $k_1$ and a proportional gain equal to null value.

7. A device for injecting a high frequency current vector which has a fixed angle with a measured current vector flowing in a machine, characterized in that the device comprises circuitry for:

measuring a motor current vector, determining a projection value of the motor current on an axis that is orthogonal to a direction having the fixed angle with the measured current vector, demodulating a high frequency variations of the projection value using a first high frequency demodulation signal, determining at least a first angle from the demodulated high frequency variation, determining an injection voltage vector at least from the first angle, a predetermined voltage and a second high frequency modulating signal, the second high frequency modulating signal having the same frequency as the first high frequency demodulating signal and a phase difference with the first high frequency demodulating signal that is equal to $\pi/2$.

8. The device according to claim 7, characterized in that the device further comprises circuitry for:

demodulating the high frequency variations of the projection value using a second high frequency demodulation signal having the same frequency as the first high frequency demodulating signal and a phase difference with the first high frequency demodulating signal that is equal to $\pi/2$, determining a second angle from the high frequency variations of the projection value demodulated using the second high frequency demodulating signal, weighting the first and second angles by respective weights that are determined from the demodulated high frequency variations of the values of the motor current on the axis that is orthogonal to the direction having the fixed angle with the measured current vector using the first and second high frequency demodulating signals, summing the weighted first and second angles, and the determined injection voltage vector is determined from the summed weighted first and second angles.

* * * * *